Patented June 24, 1941

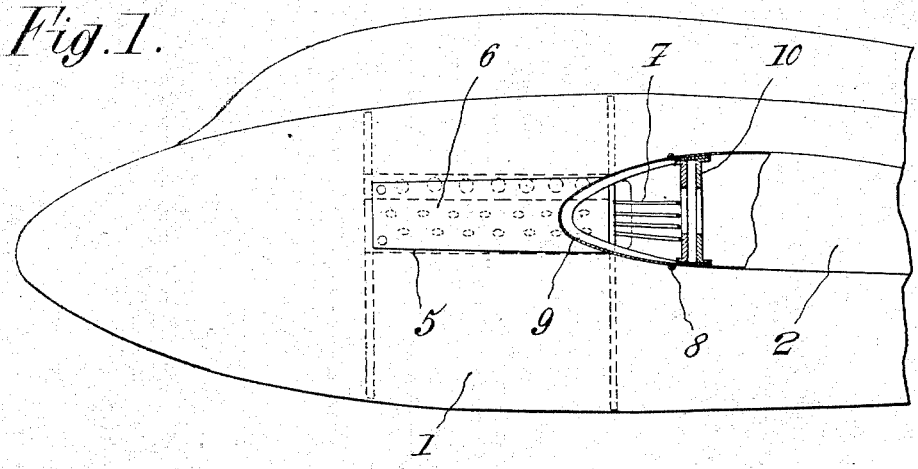
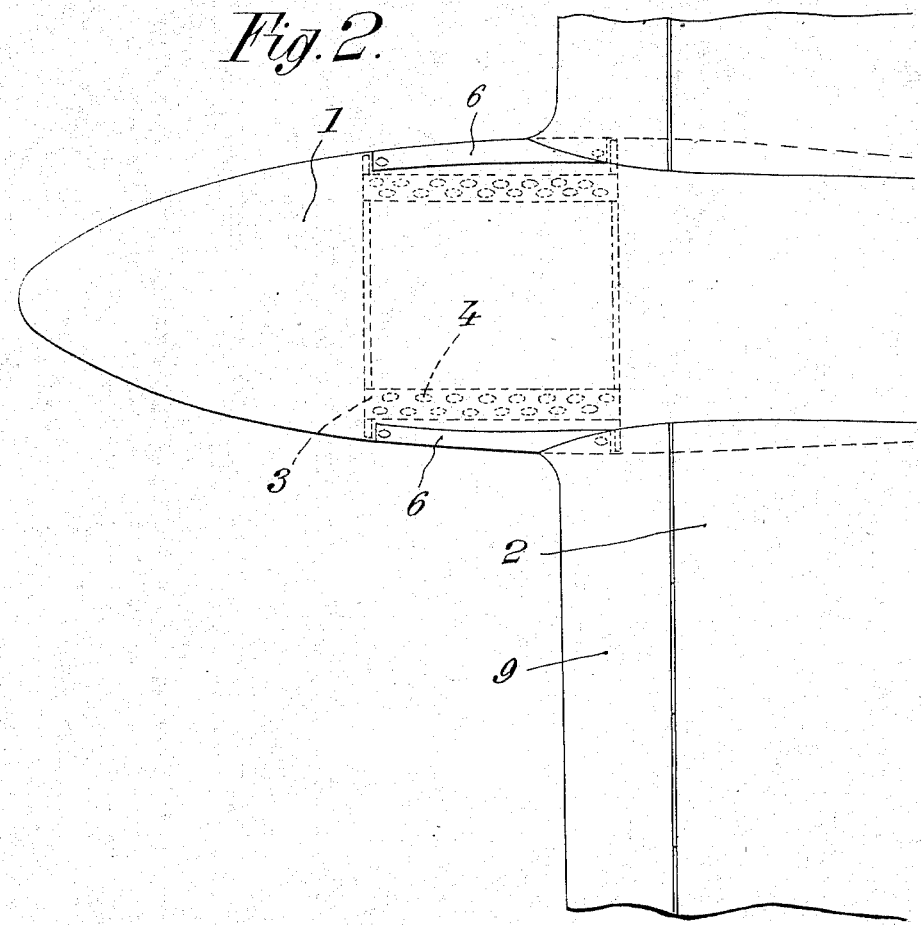

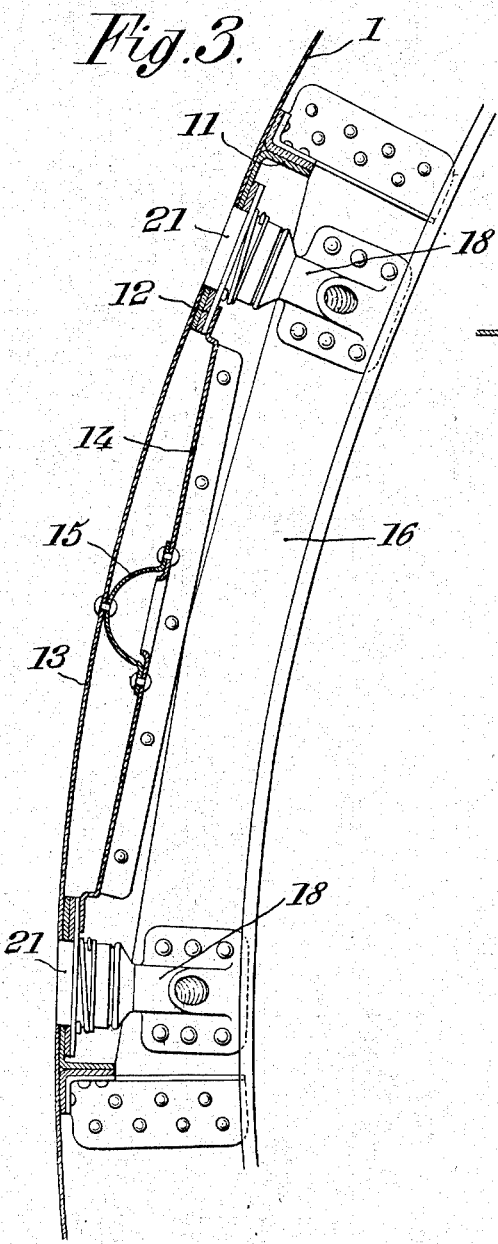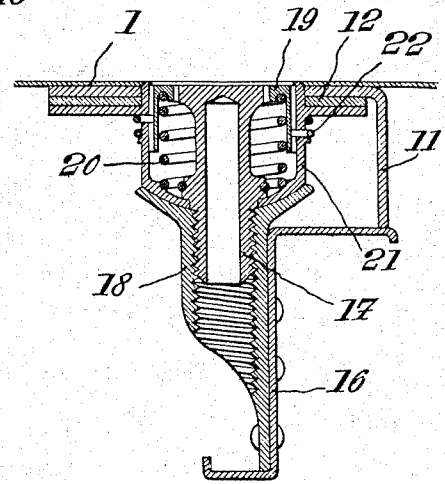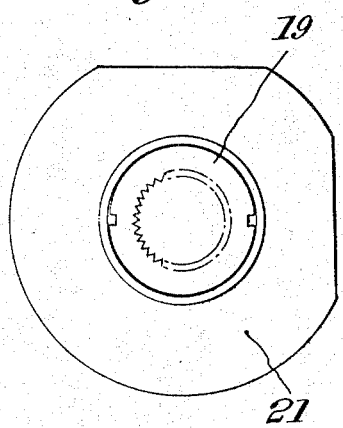

2,246,493

UNITED STATES PATENT OFFICE 2,246,493

AERIAL NAVIGATION MACHINE OF THE AIRPLANE TYPE

Félix Amiot, Neuilly-sur-Seine, France

Application January 31, 1939, Serial No. 253,927
In Luxemburg July 16, 1938

2 Claims. (Cl. 244—129)

The present invention relates to aerial navigation machines of the airplane type, and it is more especially, although not exclusively, concerned, among said machines, with airplanes having lateral engines, carried for instance by the wings, that is to say at a distance from the pilot's cockpit.

The object of the present invention is to provide a machine of this type which is better adapted to meet the requirements of practice and, in particular, in which the mounting of the various control apparatus to be carried by the instrument board or boards is facilitated and these apparatus can more easily be reached.

According to the essential feature of the present invention, the walls or skin of the machine in question is provided with removable elements adapted to withstand and to transmit the stresses acting on said walls or skin and arranged in such manner that, once they have been removed or moved away, they permit of reaching the control apparatus or instruments, or at least the various connections extending from said instruments or apparatus to the engines and other parts with which they cooperate.

Other features of the present invention will result from the following detailed description of some specific embodiments thereof.

Preferred embodiments of the present invention will be hereinafter described, with reference to the accompanying drawings given merely by way of example, and in which:

Fig. 1 diagrammatically shows, in side view, with parts in section, a portion of an airplane made according to the invention;

Fig. 2 is a corresponding plan view of the same portion of an airplane;

Fig. 3 is a sectional view, on an enlarged scale, of a portion of the fuselage of the airplane of Figs. 1 and 2;

Fig. 4 is an axial sectional view on a still larger scale of a detail of the structure illustrated by Fig. 3;

Fig. 5 is a plan view corresponding to the detail view of Fig. 4.

In the following description, it will be assumed that the present invention is applied to an airplane including a central streamlined cabin 1 and at least two lateral motor nacelles mounted in a thick wing 2, said airplane being provided with control apparatus carried by at least one instrument board and each of which is to be connected to at least one of said motors.

As it is known, up to the present time, the mounting of said apparatus was effected in a manner analogous to that employed for land vehicles, that is to say the instrument board or instrument boards, fitted with said apparatus were fixed inside the pilot's cockpit during the construction of the airplane and there remained, subsequently, to establish the electric, pneumatic, or other connections between said apparatus and the engines or other elements to be controlled.

Now, in order to establish these connections, it was necessary to work inside the airplane cockpit and this operation was generally awkward, especially in the case of airplanes of small or ordinary size. Furthermore, in the case of repairs to be effected in these apparatus or in the connections corresponding therewith, it was necessary to remove the corresponding instrument board.

In order to obviate these drawbacks, according to the present invention, I proceed in such manner that ready access to said apparatus, or at least to their connections, is made possible from the outside of the airplane. For this purpose, said airplane includes elements which, being removable or retractable and located at suitable places, permit, when so desired, of easily reaching said instruments or their connections, said elements being further made in such manner as to be able to withstand and transmit the stresses acting upon the wall or skin to which they belong.

For instance, supposing, as shown by the drawings, that the airplane includes at least one instrument board 3 carrying several control apparatus 4, this board being, for instance, disposed longitudinally of the airplane fuselage 1, I provide, in said fuselage and opposite the instrument board, an aperture 5 which is normally closed by a panel 6.

The whole is arranged in such manner that, said panel is removed after the locking means with which it is fitted have been released, it is possible easily to reach apparatus 4 and their connections 7, or at least the portion of said connections that runs along the fuselage and which is then supported through any suitable means permitting of easily reaching said connections after aperture 5 has been cleared.

Concerning now the part of the connections which goes, for instance, to the engines or to one of the engines, I have recourse, for permitting of reaching it, to an analogous arrangement. For instance, a part of the leading edge of the wing, such as portion 9 located ahead of the main spar 10 is hinged about pivots 8. Advantageously said connections are carried by 10.

Then, preferably, the parts are arranged in such manner that, on the one hand, aperture 5 overlaps the region along which the leading edge of wing 2 is joined to the fuselage and, on the other hand, the movable element 9 of said leading edge is prolonged as far as said fuselage.

With such an arrangement, it will be possible, after element 9 has been pivoted and panel 6 has been removed, fully to clear the angle of joining of the leading edge of the wing with the fuselage. The fitting in position of the various connections extending from the instrument board 3 to the engine will therefore be greatly facilitated since it will not be necessary to apply said connections around fixed portions of the airplane wall or skin for bringing them from the fuselage to the leading edge of the wing.

Concerning, more particularly, panel 6, it is made as above explained, in such manner that, when it is in position, the portion of the fuselage to which it belongs is not weakened, that is to say the stresses applied to the outline or aperture 5 cannot produce a deformation thereof.

For this purpose, for instance, the panel is essentially constituted by three elements adapted to withstand the stresses, to wit: a frame 11, reinforced at the corners by gussets 12, a curved metal sheet 13, having a shape corresponding to the part of the fuselage which initially covered aperture 5, and an edgewise located sheet 14 intended, in particular, to ensure the transmission of the longitudinal stresses, said sheet being advantageously reinforced by a $\Omega$ shaped sectional iron 15 arranged longitudinally.

Furthermore, advantageously, instead of cutting off, at the place of aperture 5, the skeleton elements 16 of fuselage 1, I bend these elements so as to deviate them inwardly along their part located opposite said aperture.

Finally, concerning the locking means to be provided for fixing panel 6 to the fuselage, said means are advantageously made in such manner that they are sufficiently strong for receiving and transmitting the fatigue resulting from the stresses to which the fuselage is subjected. For instance, they are constituted by a plurality of anchoring devices distributed along the periphery of panel 6. For instance again, there are four anchoring devices, each carried by one of the gussets 12.

In particular, these anchoring devices can be made as illustrated by Figs. 4 and 5.

In this embodiment, each of the gussets carries a screw 17 capable of coacting, preferably through contact of spherical surfaces when said screw is fully screwed, with a threaded piece 18 carried by the fixed parts of the fuselage.

For the locking of this screw, once the panel has been secured to the fuselage, I provide a kind of sleeve 19 provided with teeth capable of engaging with corresponding teeth carried by the head of screw 17. This sleeve 19 can be retracted, against the action of a spring 20, when it is desired to turn screw 17, by means of a tool provided with teeth which then come to cooperate with the teeth of the head of screw 17 instead of the teeth of sleeve 19.

The head of screw 17 and said sleeve are housed in a cylindrical piece 21 fixed to gusset 12 a torsional spring 22 being provided which tends to oppose rotation of sleeve 19 with respect to said piece 21.

Of course, the arrangements which have just been described have no limitative character and they could be applied, in particular, to instrument boards disposed transversely, the location of aperture 5 being correspondingly chosen.

The above described arrangements would also apply to instrument boards disposed at the front part of the fuselage, the invention being essentially characterized by the provision of means which permit of reaching the control apparatus and their connections from the outside of the airplane, whatever be their specific arrangement.

In all cases, whatever be the specific embodiment that is chosen, I obtain a system the operation of which is believed to result sufficiently clearly from the preceding description for making it unnecessary to enter into further explanations.

This system has over existing systems of the same kind many advantages, and in particular the fact that the mounting of the control apparatus and of the corresponding instrument boards is particularly easy and that these elements can readily be reached for repairing purposes, without impairing in any way the structural resistance of the fuselage.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An aircraft having a fuselage, an instrument board supported in said fuselage adjacent a side wall thereof, the wall of said fuselage having an opening therein opposite said instrument board whereby to provide access to the rear of said board, removable means for closing said opening, said means including an exterior sheet of material bulged whereby to provide continuity of the exterior surface of said fuselage, an inwardly extending flanged element secured to the inner side of said sheet, and substantially framing the area on the inner side of said bulged portion, and an inner sheet of material having an opposed pair of edges flanged and secured, respectively, to the inner extending portion of said flanged element whereby to transmit longitudinal forces exerted on said removable means, and means for removably securing said removable means to said fuselage.

2. An aircraft as claimed in claim 1, said interior sheet being bulged inwardly with respect to said exterior sheet, and rigid means secured to said exterior and interior sheets and connecting the same substantially at the central portions thereof.

FÉLIX AMIOT.